(12) United States Patent
Morita et al.

(10) Patent No.: US 8,481,661 B2
(45) Date of Patent: Jul. 9, 2013

(54) FLUOROELASTOMER, CURABLE COMPOSITION AND CURED RUBBER ARTICLE

(75) Inventors: Shigeru Morita, Settsu (JP); Masanori Kitaichi, Settsu (JP); Shouji Fukuoka, Settsu (JP); Daisuke Ota, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 13/143,511

(22) PCT Filed: Mar. 5, 2010

(86) PCT No.: PCT/JP2010/054156
§ 371 (c)(1),
(2), (4) Date: Jul. 6, 2011

(87) PCT Pub. No.: WO2010/101304
PCT Pub. Date: Sep. 10, 2010

(65) Prior Publication Data
US 2011/0269911 A1    Nov. 3, 2011

Related U.S. Application Data

(60) Provisional application No. 61/157,706, filed on Mar. 5, 2009, provisional application No. 61/292,557, filed on Jan. 6, 2010.

(51) Int. Cl.
*C08F 214/22* (2006.01)
*C08F 214/16* (2006.01)
*C08C 19/32* (2006.01)
*C08F 2/22* (2006.01)

(52) U.S. Cl.
USPC ........... 526/249; 526/206; 526/247; 526/253; 526/255; 525/326.3; 525/387

(58) Field of Classification Search
USPC ....... 526/255, 206, 247, 249, 253; 525/326.3, 525/387
See application file for complete search history.

(56) References Cited

U.S. PATENT DOCUMENTS

| | | |
|---|---|---|
| 2,970,988 A | 2/1961 | Lo |
| 4,866,118 A | 9/1989 | Schaberg |
| 4,948,852 A * | 8/1990 | Moore .......................... 526/247 |
| 2004/0092684 A1* | 5/2004 | Lyons ........................... 526/206 |
| 2008/0153978 A1 | 6/2008 | Samuels et al. |

FOREIGN PATENT DOCUMENTS

| WO | 02093261 A1 | 11/2002 |
|---|---|---|
| WO | 2010/005757 A1 | 1/2010 |

OTHER PUBLICATIONS

International Search Report for PCT/JP2010/054156 dated Jul. 6, 2010.
Extended European Search Report dated Mar. 28, 2013 for counterpart EP Appln. No. 13 15 6538.

* cited by examiner

*Primary Examiner* — Fred M Teskin
(74) *Attorney, Agent, or Firm* — Sughrue Mion, PLLC

(57) ABSTRACT

A noncrystalline fluoroelastomer which is a copolymer consisting essentially of vinylidene fluoride and a fluoromonomer represented by the general formula (1):

$$CH_2=CFR_f \quad (1)$$

wherein $R_f$ is a straight or branched fluoroalkyl group containing 1 to 12 carbon atoms, and has a vinylidene fluoride units/fluoromonomer units mol ratio of 78/22 to 22/78 and a glass transition temperature of not higher than 25° C.

7 Claims, 1 Drawing Sheet

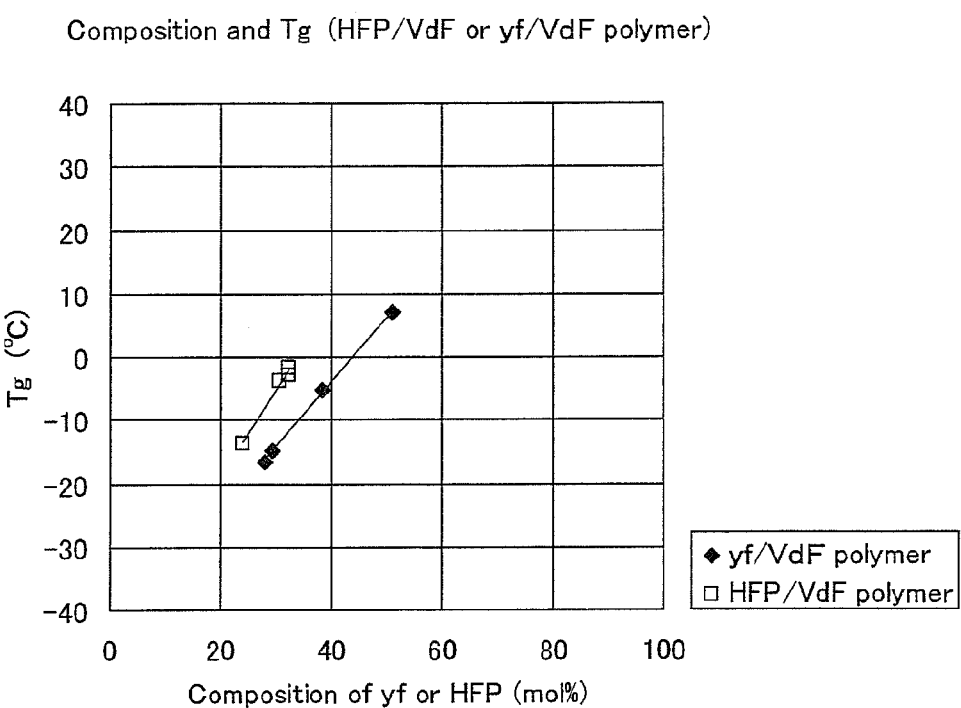

FLUOROELASTOMER, CURABLE COMPOSITION AND CURED RUBBER ARTICLE

CROSS-REFERENCE TO RELATED APPLICATIONS

This Application claims benefit under 35 U.S.C. §119(e) of U.S. Provisional Application No. 61/157,706 filed Mar. 5, 2009, and U.S. Provisional Application No. 61/292,557 filed Jan. 6, 2010, incorporated herein by reference in its entirety.

TECHNICAL FIELD

The present invention relates to a novel fluoroelastomer and a curable composition comprising the same and, further, to a cured rubber article.

BACKGROUND ART

Owing to their excellent characteristics, in particular their good thermal stability, chemical resistance and oil resistance, vinylidene fluoride (VdF)/hexafluoropropylene (HFP) copolymers, VdF/HFP/tetrafluoroethylene (TFE) copolymers and like fluoroelastomers (fluororubbers) produced by using VdF as an essential constituent monomer are used as the materials of various parts or members in such fields as the automobile, airplane and semiconductor industries where severe use conditions, such as exposures to high temperatures and/or various chemicals, are unavoidable.

Several other polymers comprising VdF as a constituent unit are also known; thus, for example, Patent Documents 1 and 2 describe that polymers were obtained by copolymerizing VdF and 2,3,3,3-tetrafluoropropene.

PRIOR ART DOCUMENTS

Patent Documents

Patent Document 1: U.S. Pat. No. 2,970,988
Patent Document 2: United States Patent Application Publication 2008/0153978

SUMMARY OF THE INVENTION

Problems which the Invention is to Solve

However, Patent Documents 1 and 2 do not describe any noncrystalline fluoroelastomers.

It is an object of the present invention to provide a noncrystalline fluoroelastomer low in glass transition temperature and excellent in amine resistance.

Means for Solving the Problems

The present inventors found that polymers comprising vinylidene fluoride units and fluoromonomer units derived from a compound represented by the general formula (1):

$$CH_2=CFR_f \quad (1)$$ 

wherein $R_f$ is a straight or branched fluoroalkyl group containing 1 to 12 carbon atoms, in specific proportions occur as noncrystalline elastomers and further found that they are very low in glass transition temperature and excellent in amine resistance. Such findings have now led to completion of the present invention.

Namely, the present invention is a noncrystalline fluoroelastomer which is a copolymer consisting essentially of vinylidene fluoride and a fluoromonomer represented by the general formula (1):

$$CH_2=CFR_f \quad (1)$$ 

wherein $R_f$ is a straight or branched fluoroalkyl group containing 1 to 12 carbon atoms, and has a vinylidene fluoride units/fluoromonomer units mol ratio of 78/22 to 22/78 and a glass transition temperature of not higher than 25° C. (Hereinafter referred to as "first fluoroelastomer")

The vinylidene fluoride units/fluoromonomer units mol ratio of the first fluoroelastomer is preferably 78/22 to 60/40.

The present invention is a noncrystalline fluoroelastomer which is a copolymer consisting essentially of vinylidene fluoride, a fluoromonomer represented by the general formula (1):

$$CH_2=CFR_f \quad (1)$$ 

wherein $R_f$ is a straight or branched fluoroalkyl group containing 1 to 12 carbon atoms, and another monomer copolymerizable with both vinylidene fluoride and said fluoromonomer of formula (1), and has a vinylidene fluoride units/fluoromonomer units mol ratio of 85/15 to 20/80, contains the other monomer units in the amount of 1 to 50 mol percent of all the monomer units and has a glass transition temperature of not higher than 25° C. (Hereinafter referred to as "second fluoroelastomer")

The vinylidene fluoride units/fluoromonomer units mol ratio of the second fluoroelastomer is preferably 85/15 to 50/50.

The fluoromonomer of the first or second fluoroelastomer is preferably 2,3,3,3-tetrafluoropropene.

The present invention is a curable composition comprising the first or second fluoroelastomer and a curing agent. Hereinafter, the curable composition comprising the first fluoroelastomer and a curing agent is referred to as "first curable composition". Hereinafter, the curable composition comprising the second fluoroelastomer and a curing agent is referred to as "second curable composition".

The present invention is a cured rubber article obtained by curing the first or second curable composition.

The present invention is a noncrystalline fluoroelastomer which is a copolymer comprising vinylidene fluoride, a fluoromonomer represented by the general formula (1):

$$CH_2=CFR_f \quad (1)$$ 

wherein $R_f$ is a straight or branched fluoroalkyl group containing 1 to 12 carbon atoms, and another monomer copolymerizable with both vinylidene fluoride and said fluoromonomer of formula (1), and has a vinylidene fluoride units/fluoromonomer units mol ratio of 85/15 to 20/80, contains the other monomer units in the amount of 0 to 50 mol percent of all the monomer units, has a glass transition temperature of not higher than 25° C. and contains at least one iodine atom and/or at least one bromine atom, the total content thereof being 0.001 to 10% by weight. (Hereinafter referred to as "third fluoroelastomer")

The third fluoroelastomer of the present invention is preferably a copolymer consisting essentially of vinylidene fluoride and a fluoromonomer represented by the general formula (1):

$$CH_2=CFR_f \quad (1)$$ 

wherein $R_f$ is a straight or branched fluoroalkyl group containing 1 to 12 carbon atoms, and has a vinylidene fluoride units/fluoromonomer units mol ratio of 80/20 to 20/80.

The vinylidene fluoride units/fluoromonomer units mol ratio of the third fluoroelastomer is preferably 85/15 to 50/50 and the other monomer units amount to 1 to 50 mol percent of all the monomer units.

The fluoromonomer of the third fluoroelastomer is preferably 2,3,3,3-tetrafluoropropene.

The present invention is a curable composition comprising the third fluoroelastomer and a curing agent. (Hereinafter referred to as "third curable composition")

The third curable composition preferably contains an organic peroxide as the curing agent.

The present invention is a cured rubber article obtained by curing the third curable composition.

Effects of the Invention

The fluoroelastomers of the invention have good rubber elasticity and are excellent in low-temperature resistance and amine resistance as well. The fluoroelastomers of the invention are lower in glass transition temperature (Tg) than vinylidene fluoride (VdF)/hexafluoropropylene (HFP) copolymers when the comparison is made under the condition that the molar content of the fluoromonomer of formula (1) is equal to the molar content of hexafluoropropylene.

BRIEF DESCRIPTION OF THE DRAWING

The drawing is a graphic representation of the glass transition temperatures versus the mol fractions of a fluoromonomer of formula (1) or HFP for the copolymers of VdF and the fluoromonomer of formula (1) as obtained in Examples 2 to 5 and for the VdF/HFP copolymers obtained in Comparative Examples 5 to 8.

DESCRIPTION OF EMBODIMENTS

The first, second and third fluoroelastomers of the invention each comprises vinylidene fluoride units and units derived from a fluoromonomer represented by the general formula (1):

$$CH_2=CFR_f \quad (1)$$

wherein $R_f$ is a straight or branched fluoroalkyl group containing 1 to 12 carbon atoms, in specific proportions and, therefore, they are noncrystalline elastomers and show a very low glass transition temperature. They are excellent in curability as well and, further, those fluoroelastomers comprising units derived from a fluoromonomer represented by the above general formula (1) are hardly dehydrofluorination and are excellent in amine resistance.

In the present specification, the term "noncrystalline" means that the melting peak (ΔH) appearing in DSC measurement (programming rate 10° C./minute) has an area not larger than 2.0 J/g.

The first, second and third fluoroelastomers of the present invention can have a glass transition temperature not higher than 25° C., or not higher than 0° C. or, further, not higher than −20° C. The fluoroelastomers of the invention show such a very low glass transition temperature and therefore are excellent in low-temperature resistance.

The glass transition temperature referred to above can be determined, using a DSC curve obtained by heating 10 mg of each sample at a programming rate of 10° C./minute using a differential scanning colorimeter (Mettler DSC 822e), as the temperature indicated by the point of intersection of an extension of the baseline in the vicinity of the second-order transition point on the DSC curve with the tangent to the DSC curve at the point of inflection.

The first fluoroelastomer of the present invention is a copolymer consisting essentially of vinylidene fluoride and a fluoromonomer represented by the formula (1), and has a vinylidene fluoride units/fluoromonomer units mol ratio of 78/22 to 22/78.

The vinylidene fluoride units/fluoromonomer units mol ratio in the first fluoroelastomer of the invention is preferably 78/22 to 60/40.

The second fluoroelastomer of the invention is a copolymer consisting essentially of vinylidene fluoride a fluoromonomer represented by the formula (1) and another monomer copolymerizable both vinylidene fluoride and said fluoromonomer of formula (1), and has a vinylidene fluoride units/fluoromonomer units mol ratio of 85/15 to 20/80, contains the other monomer units in the amount of 1 to 50 mol percent of all the monomer units.

The vinylidene fluoride units/fluoromonomer units mol ratio is 85/15 to 50/50, more preferably 85/15 to 60/40.

The other monomer units in the second fluoroelastomer of the invention preferably amount to 1 to 40 mol percent relative to all the monomer units.

In the first and second fluoroelastamers of the invention, the fluoromonomer represented by the formula (1) is preferably a monomer having a straight-chain fluoroalkyl group as $R_f$, more preferably a monomer having a straight-chain perfluoroalkyl group as $R_f$. The group $R_f$ preferably contains 1 to 6 carbon atoms.

The fluoromonomer represented by the above formula (1) includes, among others, $CH_2=CFCF_3$, $CH_2=CFCF_2CF_3$, $CH_2=CFCF_2CF_2CF_3$ and $CH_2=CFCF_2CF_2CF_2CF_3$ and, among them, $CH_2=CFCF_3$, namely 2,3,3,3-tetrafluoropropene, is preferred.

The other monomer is not particularly restricted but may be any monomer copolymerizable with vinylidene fluoride and the fluoromonomer represented by the formula (1) and may comprise one or more monomer species.

The other monomer preferably comprises at least one species selected from the group consisting of tetrafluoroethylene [TFE], hexafluoropropylene, perfluoro(methyl vinyl ether), perfluoro(ethyl vinyl ether), perfluoro(propyl vinyl ether), chlorotrifluoroethylene, trifluoroethylene, hexafluoroisobutene, vinyl fluoride, ethylene, propylene, alkyl vinyl ethers and cure site monomers and, more preferably, it is TFE. In a preferred mode of embodiment, the other monomer comprises TFE alone.

As the cure site monomers in the second fluoroelastomer of the present invention, there may be mentioned, for example, iodine- or bromine-containing monomers represented by the general formula:

$$CX^1_2=CX^1-R_f^1CHR^1X^2$$

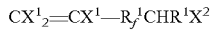

wherein $X^1$ is a hydrogen atom, a fluorine atom or $-CH_3$, $R_f^1$ is a fluoroalkylene group, a perfluoroalkylene group, a fluoropolyoxyalkylene group or a perfluoropolyoxyalkylene group, $R^1$ is a hydrogen atom or $-CH_3$ and $X^2$ is an iodine atom or a bromine atom, monomers represented by the general formula:

$$CF_2=CFO(CF(CF_3)CF_2O)_m(CF_2)_n-X^3$$

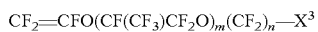

wherein m is an integer of 0 to 5, n is an integer of 1 to 3 and $X^3$ is a cyano group, a carboxyl group, an alkoxycarbonyl group, an iodine atom or a bromine atom, and monomers represented by the general formula:

$$CH_2=CFCF_2O(CF(CF_3)CF_2O)_m(CF(CF_3))_n-X^4$$

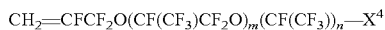

wherein m is an integer of 0 to 5, n is an integer of 1 to 3 and $X^4$ is a cyano group, a carboxyl group, an alkoxycarbonyl group, an iodine atom, a bromine atom or —$CH_2OH$.

Preferred among them is at least one species selected from the group consisting of $CF_2$=$CFOCF(CF_3)CF_2$ $OCF_2CF_2CN$, $CF_2$=$CFOCF(CF_3)CF_2OCF_2CF_2COOH$, $CF_2$=$CFOCF(CF_3)CF_2OCF_2CF_2CH_2I$, $CH_2$=$CFCF_2$ $OCF(CF_3)CF_2OCF(CF_3)CN$, $CH_2$=$CFCF_2$ $OCF(CF_3)CF_2OCF(CF_3)COOH$ and $CH_2$=$CFCF_2OCF(CF_3)CF_2OCF(CF_3)$ $CH_2OH$.

The third fluoroelastomer of the invention is a copolymer comprising vinylidene fluoride, a fluoromonomer represented by the general formula (1):

$$CH_2=CFR_f \quad (1)$$

wherein $R_f$ is a straight or branched fluoroalkyl group containing 1 to 12 carbon atoms, and another monomer copolymerizable with both vinylidene fluoride and said fluoromonomer of formula (1), and has a vinylidene fluoride units/fluoromonomer units mol ratio of 85/15 to 20/80, contains the other monomer units in the amount of 0 to 50 mol percent of all the monomer units, has a glass transition temperature of not higher than 25° C. and contains at least one iodine atom and/or at least one bromine atom, the total content thereof being 0.001 to 10% by weight.

The third fluoroelastomer of the invention is preferably a copolymer consisting essentially of vinylidene fluoride and a fluoromonomer represented by the general formula (1):

$$CH_2=CFR_f \quad (1)$$

wherein $R_f$ is a straight or branched fluoroalkyl group containing 1 to 12 carbon atoms, or a copolymer consisting essentially of vinylidene fluoride, a fluoromonomer represented by the formula (1):

$$CH_2=CFR_f \quad (1)$$

wherein $R_f$ is a straight or branched fluoroalkyl group containing 1 to 12 carbon atoms, and another monomer copolymerizable with vinylidene fluoride and the above-mentioned fluoromonomer. In this case, the third fluoroelastomer is a copolymer consisting essentially of vinylidene fluoride and a fluoromonomer represented by the general formula (1) or a copolymer consisting essentially of vinylidene fluoride, a fluoromonomer represented by the general formula (1) and above mentioned the other monomer, but the third fluoroelastomer may be produced by using an reactive emulsifier at a level at which the effects of the present invention will not be lessened. Also, the third fluoroelastomer may comprise iodine termination derived chain transfer agent.

The third fluoroelastomer of the invention is more preferably a copolymer consisting essentially of vinylidene fluoride and a fluoromonomer represented by the general formula (1):

$$CH_2=CFR_f \quad (1)$$

wherein $R_f$ is a straight or branched fluoroalkyl group containing 1 to 12 carbon atoms, and has a vinylidene fluoride units/fluoromonomer units mol ratio of 80/20 to 20/80.

The vinylidene fluoride units/fluoromonomer units mol ratio in the third fluoroelastomer of the invention is preferably 85/15 to 50/50, and the other monomer units amount to 1 to 50 mol percent of all the monomer units.

In the third fluoroelastomer of the invention, the fluoromonomer is preferably 2,3,3,3-tetrafluoropropene.

Each monomer unit content is the value determined by an NMR technique.

The third fluoroelastomer of the invention contains iodine atoms and/or bromine atoms, with the total content thereof being 0.001 to 10% by weight. The total content of iodine atoms and bromine atoms is preferably 0.01 to 5% by weight, more preferably 0.1 to 5% by weight. The iodine content can be determined by admixing 5 mg of $Na_2SO_3$ with 12 mg of the sample (fluoroelastomer), combusting the mixture in an oxygen atmosphere in a quartz combustion flask using an absorbing solution prepared by dissolving 30 mg of a 1:1 (weight ratio) mixture of $Na_2CO_3$ and $K_2CO_3$ in 20 ml of pure water, followed by 30 minutes of standing and further followed by quantitation using a Shimadzu model 20A ion chromatograph. The working curve can be prepared by using standard KI solutions having an iodine ion content of 0.5 ppm or 1.0 ppm.

As for the binding sites of iodine and bromine atoms, each iodine or bromine atom may be bound to a terminus of the main chain or the terminus of a side chain of the fluoroelastomer; of course, both such sites may each be occupied by an iodine or bromine atom. Each iodine terminus or bromine terminus serves as a curing point (curing site) to give a cured fluoroelastomer having a high cure density and, in addition, facilitate peroxide curing.

The third fluoroelastomer of the invention can be produced by using an iodine- or bromine-containing monomer as the cure site monomers or by using a bromine compound or an iodine compound as the polymerization initiator or chain transfer agent.

The fluoromonomer of formula (1) in the third fluoroelastomer of the invention is preferably a monomer in which $R_f$ is a straight-chain fluoroalkyl group, more preferably a monomer in which $R_f$ is a straight-chain perfluoroalkyl group. The number of carbon atoms in $R_f$ is preferably 1 to 6.

The fluoromonomer represented by the above formula (1) includes, among others, $CH_2$=$CFCF_3$, $CH_2$=$CFCF_2CF_3$, $CH_2$=$CFCF_2CF_2CF_3$ and $CH_2$=$CFCF_2CF_2CF_2CF_3$ and, among them, $CH_2$=$CFCF_3$, namely 2,3,3,3-tetrafluoropropene, is preferred.

In the third fluoroelastomer of the invention, the other monomer (Cure site monomers are excluded.) is not particularly restricted but may be any monomer copolymerizable with vinylidene fluoride and the fluoromonomer represented by the formula (1) and may comprise one or more monomer species.

The other monomer preferably comprises at least one species selected from the group consisting of tetrafluoroethylene [TFE], hexafluoropropylene, perfluoro(methyl vinyl ether), perfluoro(ethyl vinyl ether), perfluoro(propyl vinyl ether), chlorotrifluoroethylene, trifluoroethylene, hexafluoroisobutene, vinyl fluoride, ethylene, propylene, alkyl vinyl ethers and cure site monomers and, more preferably, it is TFE. In a preferred mode of embodiment, the other monomer comprises TFE alone. The other monomer in the third fluoroelastomer of the invention amount to 0 to 50 mol percent, relative to all the monomer units. In a preferred mode of embodiment, the other monomer in the third fluoroelastomer of the invention amount to 1 to 50 mol percent, relative to all the monomer units.

As the cure site monomers in the third fluoroelastomer of the invention, there may be mentioned, for example, iodine- or bromine-containing monomers represented by the general formula:

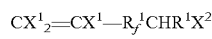

$$CX^1{}_2=CX^1—R_f{}^1CHR^1X^2$$

wherein $X^1$ is a hydrogen atom, a fluorine atom or —$CH_3$, $R_f{}^1$ is a fluoroalkylene group, a perfluoroalkylene group, a fluoropolyoxyalkylene group or a perfluoropolyoxyalkylene group, $R^1$ is a hydrogen atom or —$CH_3$ and $X^2$ is an iodine atom or a bromine atom, iodine- or bromine-containing monomers represented by the general formula:

$$CX^1_2\!=\!CX^1\!-\!R_f^1X^2$$

wherein $X^1$ is a hydrogen atom, a fluorine atom or —$CH_3$, $R_f^1$ is a fluoroalkylene group, a perfluoroalkylene group, a fluoropolyoxyalkylene group or a perfluoropolyoxyalkylene group, $R^1$ is a hydrogen atom or —$CH_3$ and $X^2$ is an iodine atom or a bromine atom, preferably iodine-containing monomers represented by the general formula:

$$CH_2\!=\!CH(CF_2)_nI$$

wherein n is integer of 2 to 8, monomers represented by the general formula:

$$CF_2\!=\!CFO(CF(CF_3)CF_2O)_m(CF_2)_n\!-\!X^3$$

wherein m is an integer of 0 to 5, n is an integer of 1 to 3 and $X^3$ is a cyano group, a carboxyl group, an alkoxycarbonyl group, an iodine atom or a bromine atom, monomers represented by the general formula:

$$CH_2\!=\!CFCF_2O(CF(CF_3)CF_2O)_m(CF(CF_3))_n\!-\!X^4$$

wherein m is an integer of 0 to 5, n is an integer of 1 to 3 and $X^4$ is a cyano group, a carboxyl group, an alkoxycarbonyl group, an iodine atom, a bromine atom or —$CH_2OH$, monomers represented by the general formula:

$$R^2R^3\!=\!CR^4\!-\!Z\!-\!CR^5\!=\!CR^6R^7$$

wherein $R^2$, $R^3$, $R^4$, $R^5$, $R^6$ and $R^7$ are the same or different and each represent a hydrogen atom or an alkyl group containing 1 to 5 carbon atoms, Z optionally having one or more oxygen atoms is a straight or branched alkylene group containing 1 to 18 carbon atoms, a straight or branched cycloalkylene group containing 3 to 18 carbon atoms, a straight or branched (per) fluoroalkylene group containing 1 to 10 carbon atoms, a straight or branched (per) fluoropolyoxyalkylene group containing 1 to 10 carbon atoms or a straight or branched (per)fluoropolyoxyalkylene group represented by following formula:

$$-(Q)_p\!-\!CF_2O\!-\!(CF_2CF_2O)_n(CF_2O)_n\!-\!CF_2\!-\!(Q)$$

wherein each Q is the same or different and a alkylene group or an oxyalkylene group containing 1 to 10 carbon atoms, each p is the same or different and 0 or 1, m and n are integer numbers and m/n is 0.2 to 5, molecular weight of the (per) fluoropolyoxyalkylene group is 500 to 10000.

As the monomers represented by the general formula $R^2R^3\!=\!CR^4\!-\!Z\!-\!CR^6\!=\!CR^6R^7$, there may be mentioned, for example, $CH_2\!=\!CH\!-\!(CF_2)_4\!-\!CH\!=\!CH_2$, $CH_2\!=\!CH\!-\!(CF_2)_6\!-\!CH\!=\!CH_2$, monomer represented by a following formula:

$$CH_2\!=\!CH\!-\!Z^1\!-\!CH\!=\!CH_2$$

wherein $Z^1$ is fluoropolyoxyalkylene group represented by a formula —$CH_2OCH_2\!-\!CF_2O\!-\!(CF_2CF_2O)_{m1}(CF_2O)_{n1}$—$CF_2\!-\!CH_2OCH_2$—, m1/n1 is 0.5. Molecular weight of the monomer is 2000.

In a preferred mode of embodiment, the curing site-imparting monomer comprises at least one species selected from the group consisting of $CF_2\!=\!CFOCF(CF_3)CF_2OCF_2CF_2CN$, $CF_2\!=\!CFOCF(CF_3)CF_2OCF_2CF_2COOH$, $CF_2\!=\!CFOCF(CF_3)CF_2OCF_2CF_2CH_2I$, $CF_2\!=\!CFOCF_2CF_2CH_2I$, $CH_2\!=\!CFCF_2OCF(CF_3)CF_2OCF(CF_3)CN$, $CH_2\!=\!CFCF_2OCF(CF_3)CF_2OCF(CF_3)COOH$, $CH_2\!=\!CFCF_2OCF(CF_3)CF_2OCF(CF_3)CH_2OH$ and $CH_2\!=\!CHCF_2CF_2I$, $CH_2\!=\!CH(CF_2)_2CH\!=\!CH_2$.

In another preferred mode of embodiment, the curing site-imparting monomer comprises at least one monomer selected from the group consisting, for example, of iodine- or bromine-containing monomers represented by the general formula:

$$CX^1_2\!=\!CX^1\!-\!R_f^1CHR^1X^2$$

wherein $X^1$ is a hydrogen atom, a fluorine atom or —$CH_3$, $R_f^1$ is a fluoroalkylene group, a perfluoroalkylene group, a fluoropolyoxyalkylene group or a perfluoropolyoxyalkylene group, $R^1$ is a hydrogen atom or —$CH_3$ and $X^2$ is an iodine atom or a bromine atom, iodine- or bromine-containing monomers represented by the general formula:

$$CX^1_2\!=\!CX^1\!-\!R_f^1X^2$$

wherein $X^1$ is a hydrogen atom, a fluorine atom or —$CH_3$, $R_f^1$ is a fluoroalkylene group, a perfluoroalkylene group, a fluoropolyoxyalkylene group or a perfluoropolyoxyalkylene group, $R^1$ is a hydrogen atom or —$CH_3$ and $X^2$ is an iodine atom or a bromine atom, preferably iodine-containing monomers represented by the general formula:

$$CH_2\!=\!CH(CF_2)_nI$$

wherein n is integer of 2 to 8, monomers represented by the general formula:

$$CF_2\!=\!CFO(CF(CF_3)CF_2O)_m(CF_2)_n\!-\!X^5$$

wherein m is an integer of 0 to 5, n is an integer of 1 to 3 and $X^5$ is an iodine atom or a bromine atom, and monomers represented by the general formula:

$$CH_2\!=\!CFCF_2O(CF(CF_3)CF_2O)_m(CF(CF_3))_n\!-\!X^5$$

wherein m is an integer of 0 to 5, n is an integer of 1 to 3 and $X^5$ is an iodine atom or a bromine atom. By using such an iodine- or bromine-containing monomer as the other monomer, it also becomes possible to produce the third fluoroelastomer of the invention.

The curing site-imparting monomer in the third fluoroelastomer of the invention preferably amount to 0.01 to 10 mol percent, more preferably 0.01 to 2 mol percent, relative to all the monomer units.

The first, second and third fluoroelastomers of the invention can be produced by a conventional radical polymerization method. The manner of polymerization may be any of such manners as bulk polymerization, solution polymerization, suspension polymerization and emulsion polymerization; emulsion polymerization is preferred, however, since it can be easily carried out on an industrial scale.

In the above polymerization, a polymerization initiator, a chain transfer agent, a surfactant and a solvent can be used, and these may respectively be ones known in the art.

In the production, by polymerization, of the first, second or third fluoroelastomer of the invention, an oil-soluble radical polymerization initiator or a water-soluble radical initiator can be used as the polymerization initiator.

The oil-soluble radical polymerization initiator may be any of known oil-soluble peroxides; typical examples are, for example, dialkyl peroxydicarbonates such as diisopropyl peroxydicarbonate and di-sec-butyl peroxydicarbonate, peroxyesters such as tert-butyl peroxyisobutyrate and tert-butyl peroxypivalate, dialkyl peroxides such as di-tert-butyl peroxide and, further,
di(ω-hydro-dodecafluoroheptanoyl)peroxide,
di(ω-hydro-tetradecafluoroheptanoyl)peroxide,
di(ω-hydro-hexadecafluorononanoyl)peroxide,
di(perfluorobutyryl)peroxide, di(perfluorovaleryl)peroxide,
di(perfluorohexanoyl)peroxide, di(perfluoroheptanoyl) peroxide, di(perfluorooctanoyl)peroxide,
di(perfluorononanoyl)peroxide,
di(ω-chloro-hexafluorobutyryl)peroxide, di(ω-chloro-decafluorohexanoyl)peroxide,
di(ω-chloro-tetradecafluorooctanoyl)peroxide,
ω-hydro-dodecafluoroheptanoyl ω-hydrohexadecafluorononanoyl peroxide, ω-chloro-hexafluorobutyryl ω-chloro-decafluorohexanoyl peroxide,
ω-hydrododecafluoroheptanoyl perfluorobutyryl peroxide,
di(dichloropentafluorobutanoyl)peroxide,
di(trichlorooctafluorohexanoyl)peroxide,
di(tetrachloroundecafluorooctanoyl)peroxide,
di(pentachlorotetradecafluorodecanoyl)peroxide,
di(undecachlorotriacontafluorodocosanoyl)peroxide and like di[perfluoro(or fluorochloro)acyl]peroxides.

The water-soluble radical polymerization initiator may be, for example, such a known water-soluble peroxide as the ammonium salt, potassium salt or sodium salt of persulfuric acid, perboric acid, perchloric acid, perphosphoric acid, percarbonic acid or the like, tert-butyl permaleate or tert-butyl hydroperoxide. It may also contain such a reducing agent as a sulfite or a sulfite salt in combination, and this may be used in an amount of 0.1 to 20 times the amount of the peroxide.

While the level of addition of the radical polymerization initiator is not particularly restricted, the initiator may be added all at once at the initial stage of polymerization or in portions or continuously in a manner such that the amount thereof added each time may not cause a marked reduction in rate of polymerization (for example, a concentration of several ppm relative to water may be obtained). From the apparatus viewpoint, the upper limit thereto is within the range in which the heat of polymerization can be dissipated.

Usable as the surfactant are nonionic surfactants, anionic surfactants and cationic surfactants, among others; preferred are straight or branched fluorinated anionic surfactants containing 4 to 20 carbon atoms, for example ammonium perfluorooctanoate and the like. The level of addition thereof is preferably 10 to 5000 ppm. (relative to the amount of water used in the polymerization). More preferably 50 to 5000 ppm.

Also, Usable as the surfactant are reactive emulsifiers. The reactive emulsifiers are not particularly restricted but may be any monomer having at least one unsaturated bond and at least one hydrophilic group; thus, mention may be made of $CF_2=CFCF_2OCF(CF_3)CF_2OCF(CF_3)COONH_4$, for instance. The level of addition thereof is preferably 10 to 5000 ppm. (relative to the amount of water used in the polymerization). More preferably 50 to 5000 ppm.

A solvent incapable of inducing chain transfer is preferred as the solvent. In the case of solution polymerization, mention may be made of dichloropentafluoropropane (R-225) and, in the case of emulsion polymerization or suspension polymerization, mention may be made of water or mixtures of water and a water-soluble organic solvent.

As the chain transfer agent to be used in the production of the first or second fluoroelastomers of the invention by polymerization, there may be mentioned such esters as dimethyl malonate, diethyl malonate, methyl acetate, ethyl acetate, butyl acetate and dimethyl succinate and, further, isopentane, methane, ethane, propane, isopropanol, acetone, various mercaptans, carbon tetrachloride and cyclohexane, among others.

A bromine compound or an iodine compound may also be used as the chain transfer agent. As the method of carrying out the polymerization using a bromine compound or an iodine compound, there may be mentioned the method comprising carrying out emulsion polymerization in an aqueous medium under pressure in the presence of a bromine compound or an iodine compound in a substantially oxygen-free condition (iodine transfer polymerization method). Typical examples of the bromine compound or iodine compound to be used are, for example, compounds represented by the general formula:

$$R^2I_xBr_y$$

wherein x and y each is an integer of 0 to 2, with the provision that they satisfy the relation $1 \leq x+y \leq 2$, and $R^2$ is a saturated or unsaturated fluorohydrocarbon or chlorofluorohydrocarbon group containing 1 to 16 carbon atoms or a hydrocarbon group containing 1 to 3 carbon atoms and may contain an oxygen atom or atoms. The use of such a bromine compound or iodine compound results in introduction of iodine or bromine atoms into the product polymer, so that they may function as sites of curing.

As the iodine compound, there may be mentioned, for example,
1,3-diiodoperfluoropropane, 2-iodoperfluoropropane,
1,3-diiodo-2-chloroperfluoropropane,
1,4-diiodoperfluorobutane,
1,5-diiodo-2,4-dichloroperfluoropentane,
1,6-diiodoperfluorohexane, 1,8-diiodoperfluorooctane,
1,12-diiodoperfluorododecane,
1,16-diiodoperfluorohexadecane, diiodomethane,
1,2-diiodoethane, 1,3-diiodo-n-propane, $CF_2Br_2$, $BrCF_2CF_2Br$,
$CF_3CFBrCF_2Br$, $CFClBr_2$, $BrCF_2CFClBr$, $CFBrClCFClBr$, $BrCF_2CF_2CF_2Br$,
$BrCF_2CFBrOCF_3$, 1-bromo-2-iodoperfluoroethane,
1-bromo-3-iodoperfluoropropane,
1-bromo-4-iodoperfluorobutane,
2-bromo-3-iodoperfluorobutane,
3-bromo-4-iodoperfluorobutene-1,
2-bromo-4-iodoperfluorobutene-1, monoiodo- and monobromo-substituted benzenes, diiodo- and monobromo-substituted benzenes, and (2-iodoethyl)- and (2-bromoethyl)-substituted benzenes, among others; these compounds may be used singly or in combination.

Among those mentioned above, 1,4-diiodoperfluorobutane, 1,6-diiodoperfluorohexane and 2-iodoperfluoropropane are preferably used in view of their reactivity in polymerization, reactivity in curing and ready availability, among others.

In producing the third fluoroelastomer of the invention by polymerization, a bromine compound or an iodine compound is preferably used as the chain transfer agent. As the method of carrying out the polymerization using a bromine compound or an iodine compound, there may be mentioned the method comprising carrying out emulsion polymerization in an aqueous medium under pressure in the presence of a bromine compound or an iodine compound in a substantially oxygen-free condition (iodine transfer polymerization method). Typical examples of the bromine compound or iodine compound to be used are, for example, compounds represented by the general formula:

$$R^2I_xBr_y$$

wherein x and y each is an integer of 0 to 2, with the provision that they satisfy the relation $1 \leq x+y \leq 2$, and $R^2$ is a saturated or unsaturated fluorohydrocarbon or chlorofluorohydrocarbon group containing 1 to 16 carbon atoms or a hydrocarbon group containing 1 to 3 carbon atoms and may contain an oxygen atom or atoms. The use of such a bromine compound or iodine compound results in introduction of iodine or bromine atoms into the product polymer, so that they may function as sites of curing.

As the iodine compound, there may be mentioned, for example,
1,3-diiodoperfluoropropane, 2-iodoperfluoropropane,
1,3-diiodo-2-chloroperfluoropropane, 1,4-diiodoperfluorobutane,
1,5-diiodo-2,4-dichloroperfluoropentane,
1,6-diiodoperfluorohexane, 1,8-diiodoperfluorooctane,
1,12-diiodoperfluorododecane,
1,16-diiodoperfluorohexadecane, diiodomethane,
1,2-diiodoethane, 1,3-diiodo-n-propane, $CF_2Br_2$, $BrCF_2CF_2Br$,
$CF_3CFBrCF_2Br$, $CFClBr_2$, $BrCF_2CFClBr$, $CFBrClCFClBr$, $BrCF_2CF_2CF_2Br$,
$BrCF_2CFBrOCF_3$, 1-bromo-2-iodoperfluoroethane,
1-bromo-3-iodoperfluoropropane,
1-bromo-4-iodoperfluorobutane,
2-bromo-3-iodoperfluorobutane,
3-bromo-4-iodoperfluorobutene-1,
2-bromo-4-iodoperfluorobutene-1, monoiodo- and monobromo-substituted benzenes, diiodo- and monobromo-substituted benzenes, and (2-iodoethyl)- and (2-bromoethyl)-substituted benzenes, among others; these compounds may be used singly or in combination.

Among those mentioned above, 1,4-diiodoperfluorobutane, 1,6-diiodoperfluorohexane and 2-iodoperfluoropropane are preferably used in view of their reactivity in polymerization, reactivity in curing and ready availability, among others.

Also usable as the chain transfer agent mentioned above in producing the third fluoroelastomer of the invention by polymerization are, for example, such esters as dimethyl malonate, diethyl malonate, methyl acetate, ethyl acetate, butyl acetate and dimethyl succinate and, further, isopentane, methane, ethane, propane, isopropanol, acetone, various mercaptans, carbon tetrachloride and cyclohexane, among others.

In the polymerization for producing the first, second and third fluoroelastomers of the invention, the polymerization temperature, polymerization pressure and polymerization time may respectively be −15 to 150° C., atmospheric pressure to 6.5 MPa, and 1 to 24 hours, although they may vary depending on the solvent and/or polymerization initiator species selected. In particular, when a fluorine atom-containing, oil-soluble radical polymerization initiator is used as the polymerization initiator in solution polymerization, the polymerization temperature is preferably −15 to 50° C., more preferably 10 to 35° C. When a fluorine atom-containing, oil-soluble radical polymerization initiator is used in emulsion or suspension polymerization, the polymerization temperature is preferably 30 to 95° C. When a water-soluble radical polymerization initiator is used as the polymerization initiator, the polymerization temperature is preferably 0 to 100° C., more preferably 10 to 95° C.

The first, second or third fluoroelastomer of the invention may occur in any form, for example in the form of an aqueous dispersion or powder.

In the case of emulsion polymerization, the fluoroelastomer in powder form can be obtained by causing the dispersion after polymerization to coagulate, washing the coagulum with water and dehydrating and drying the same. The coagulation can be caused by addition of an inorganic salt, such as aluminum sulfate, or an organic acid, by application of a shearing force, or by freezing the dispersion. In the case of suspension polymerization, it can be obtained by recovering the polymer from the dispersion after polymerization and drying the same. In the case of solution polymerization, it can be obtained by subjecting the fluoroelastomer-containing solution as such to drying or, alternatively, by purifying the polymer by dropwise addition of a poor solvent.

The first, second or third fluoroelastomer of the invention is also suited for use as a low-temperature resistant seal material and, for that reason, among others, it preferably has a number average molecular weight (Mn) of 7000 to 500000 and a weight average molecular weight (Mw) of 10000 to 1000000, with the ratio Mw/Mn preferably being 1.3 to 4.0.

The above-mentioned number average molecular weight (Mn), weight average molecular weight (Mw) and ratio Mw/Mn values are respectively the values determined by the GPC method.

For showing good moldability/processability, the first, second or third fluoroelastomer of the invention preferably has a Mooney viscosity at 100° C. (ML1+10(100° C.)) of not lower than 2, more preferably not lower than 5. Also from the viewpoint of good moldability/processability, the Mooney viscosity is preferably not higher than 200, more preferably not higher than 150, still more preferably not higher than 100. Each Mooney viscosity value referred to above is the value determined in accordance with ASTM D 1646 and JIS K 6300.

The present invention relates also to a curable composition excellent in curability which is characterized in that it comprises the above-mentioned first, second or third fluoroelastomer of the invention and a curing agent.

The level of addition of the curing agent is 0.01 to 10 parts by mass, preferably 0.1 to 5 parts by mass, per 100 parts by mass of the fluoroelastomer. When the level of the curing agent is lower than 0.01 part by mass, the degree of curing is insufficient, so that the performance characteristics of the fluoroelastomer articles tend to be impaired while, at addition levels exceeding 10 parts by mass, the cure density becomes excessively high, so that the curing time becomes prolonged; in addition, such levels tend to be also disadvantageous from the economical viewpoint.

The above-mentioned curing agent is not particularly restricted but may be any of those curing agents which are generally used in polyamine curing, polyol curing or peroxide curing; preferably, however, it comprises at least one species selected from the group consisting of polyamine compounds, polyhydroxy compounds and organic peroxides.

As the polyamine compounds, there may be mentioned, for example, hexamethylenediamine carbamate, N,N'-dicinnamylidene-1,6-hexamethylenediamine and 4,4'-bis(aminocyclohexyl)methane carbamate. Among these, N,N'-dicinnamylidene-1,6-hexamethylenediamine is preferred.

Preferably used as the polyhydroxy compound are polyhydroxy aromatic compounds in view of their excellent thermal stability.

The above-mentioned polyhydroxy aromatic compounds are not particularly restricted but include, among others, 2,2-bis(4-hydroxyphenyl)propane (hereinafter referred to as "bisphenol A"), 2,2-bis(4-hydroxyphenyl)perfluoropropane (hereinafter referred to as "bisphenol AF"), resorcinol, 1,3-dihydroxybenzene, 1,7-dihydroxynaphthalene, 2,7-dihydroxynaphthalene, 1,6-dihydroxynaphthalene, 4,4'-dihydroxydiphenyl, 4,4'-dihydroxystilbene, 2,6-dihydroxyanthracene, hydroquinone, catechol, 2,2-bis(4-hydroxyphenyl)butane (hereinafter referred to as "bisphenol B"), 4,4-bis(4-hydroxyphenyl)valeric acid, 2,2-bis(4-hydroxyphenyl)tetrafluorodichloropropane, 4,4'-dihydroxydiphenyl sulfone, 4,4'-dihydroxydiphenyl ketone, tri(4-hydroxyphenyl)methane, 3,3',5,5'-tetrachlorobisphenol A and 3,3',5,5'-tetrabromobisphenol A. These polyhydroxy aromatic compounds each may occur in the form of an alkali metal salt or alkaline earth metal salt, for instance. In the case of copolymer coagulation using an acid, the use of such metal salts is preferably avoided.

In the case of the curing agent being a polyhydroxy compound, the curable composition of the invention preferably contains a curing promoter. The curing promoter accelerates the formation of intramolecular double bonds due to the dehydrofluorination reaction of the fluoroelastomer main chain and the addition of the polyhydroxy compound to the resulting double bonds.

As the curing promoter, there may be mentioned onium compounds, and the curing promoter preferably comprises at least one species selected from the group consisting of onium compounds, in particular such ammonium compounds as quaternary ammonium salts, such phosphonium compounds as quaternary phosphonium salts, oxonium compounds, sulfonium compounds, cyclic amines and monofunctional amine compounds, more preferably at least one species selected from the group consisting of quaternary ammonium salts and quaternary phosphonium salts.

The quaternary ammonium salts are not particularly restricted but include, among others,
8-methyl-1,8-diazabicyclo[5.4.0]-7-undecenium chloride,
8-methyl-1,8-diazabicyclo[5.4.0]-7-undecenium iodide,
8-methyl-1,8-diazabicyclo[5.4.0]-7-undecenium hydroxide,
8-methyl-1,8-diazabicyclo[5.4.0]-7-undecenium methylsulfate,
8-ethyl-1,8-diazabicyclo[5.4.0]-7-undecenium bromide,
8-propyl-1,8-diazabicyclo[5.4.0]-7-undecenium bromide,
8-dodecyl-1,8-diazabicyclo[5.4.0]-7-undecenium chloride,
8-dodecyl-1,8-diazabicyclo[5.4.0]-7-undecenium hydroxide,
8-eicosyl-1,8-diazabicyclo[5.4.0]-7-undecenium chloride,
8-tetracosyl-1,8-diazabicyclo[5.4.0]-7-undecenium chloride,
8-benzyl-1,8-diazabicyclo[5.4.0]-7-undecenium chloride (hereinafter referred to as "DBU-B"),
8-benzyl-1,8-diazabicyclo[5.4.0]-7-undecenium hydroxide,
8-phenethyl-1,8-diazabicyclo[5.4.0]-7-undecenium chloride and 8-(3-phenylpropyl)-1,8-diazabicyclo[5.4.0]-7-undecenium chloride. Among these, DBU-B is preferred from the viewpoint that the curing performance thereof and the physical characteristics of the articles are excellent.

The quaternary phosphonium salts are not particularly restricted but include, among others, tetrabutylphosphonium chloride, benzyltriphenylphosphonium chloride (hereinafter referred to as "BTPPC"), benzyltrimethylphosphonium chloride, benzyltributylphosphonium chloride, tributylallylphosphonium chloride, tributyl-2-methoxypropylphosphonium chloride and benzylphenyl(dimethylamino)phosphonium chloride. Among these, benzyltriphenylphosphonium chloride (BTPPC) is preferred from the viewpoint that the curing performance thereof and the physical characteristics of the articles are excellent.

Also usable as the curing promoter are solid solutions of quaternary ammonium salts or quaternary ammonium salts with bisphenol AF as well as the chlorine-free curing promoters disclosed in Japanese Kokai Publication H11-147891.

The level of addition of the curing promoter is preferably 0.01 to 8 parts by mass, more preferably 0.02 to 5 parts by mass, per 100 parts by mass of the fluoroelastomer. At curing promoter addition levels below 0.01 part by mass, the curing of the fluoroelastomer will not proceed to a sufficient extent, hence the articles obtained tend to show reduced thermal stability and oil resistance. At levels exceeding 8 parts by mass, the moldability/processability of the curable composition tends to be lowered.

As for the organic peroxides, use may be made of those organic peroxides which readily generate peroxy radicals in the presence of an acid or an oxidation/reduction system, for example
1,1-bis(tert-butylperoxy)-3,5,5-trimethylcyclohexane,
2,5-dimethylhexane 2,5-dihydroperoxide, di-tert-butyl peroxide, tert-butyl cumyl peroxide, dicumyl peroxide,
α,α-bis(tert-butylperoxy)-p-diisopropylbenzene,
2,5-dimethyl-2,5-di(tert-butylperoxy)hexane,
2,5-dimethyl-2,5-di(tert-butylperoxy)hexyne-3, benzoyl peroxide, tert-butylperoxybenzene, tert-butyl peroxymaleate, tert-butyl peroxyisopropylcarbonate and tert-butyl peroxybenzoate. Among these,
2,5-dimethyl-2,5-di(tert-butylperoxy)hexane and
2,5-dimethyl-2,5-di(tert-butylperoxy)hexyne-3 are preferred.

When the curing agent is an organic peroxide, the curable composition of the invention preferably contains a curing aid. As the curing aid, there may be mentioned, for example, triallyl cyanurate, triallyl isocyanurate (TAIC), triacrylformal, triallyl trimellitate, N,N'-m-phenylenebismaleimide, dipropargyl terephthalate, diallyl phthalate, tetraallyl terephthalamide, triallyl phosphate, bismaleimide, fluorinated triallyl isocyanurate (1,3,5-tris(2,3,3-trifluoro-2-propenyl)-1,3,5-triazine-2,4,6-trione), tris(diallylamino)-s-triazine, triallyl phosphate, N,N-diallylacrylamide, 1,6-divinyldodecafluorohexane, hexallylphosphoramide, N,N,N',N'-tetraallylphthalamide, N,N,N',N'-tetraallylmalonamide, trivinyl isocyanurate, 2,4,6-trivinylmethyltrisiloxane, tri(5-norbornene-2-methylene) cyanurate and triallyl phosphate. Among these, triallyl isocyanurate (TAIC) is preferred from the viewpoint that the curing performance thereof and the physical characteristics of the articles are excellent.

The level of addition of the curing aid is 0.01 to 10 parts by mass, preferably 0.1 to 5.0 parts by mass, per 100 parts by mass of the fluoroelastomer. At curing aid levels lower than 0.01 part by mass, the curing time tends to become too long to be suited to practical use and, at levels exceeding 10 parts by mass, the curing time becomes too short and, in addition, the articles tend to show decreases in permanent compression set.

The curing is generally realized by baking at a temperature of 150 to 300° C. for 1 minute to 24 hours, although the curing conditions may be properly selected according to the curing agent species employed, among others. The curing can be realized at ordinary pressure or under increased or reduced pressure and in air as well.

The method of curing is not particularly restricted but use may be made of steam curing, compression molding or any other conventional method by which the curing reaction is initiated by heating; the radiation curing method under ordinary temperature and ordinary pressure may also be used.

A post-treatment step called post-curing may also be made after a first curing treatment (called press vulcanization).

The polyamine curing using a polyamine compound as the curing agent can be carried out in the same manner as in the prior art. For example, mention may be made of the method comprising subjecting the fluoroelastomer of the invention and a curing agent, if necessary together with a curing promoter and further another or other appropriate compatible additives, to roll milling, then placing the kneaded mass in a mold and applying pressure thereto for press curing, which is followed by post-curing. As for the press curing conditions, the temperature is generally selected within the range of 100 to 200° C., the time within the range of 5 to 120 minutes, and the pressure within the range of about 2 to 10 MPa and, as for the post-curing conditions, the temperature is generally selected within the range of 150 to 300° C., and the time within the range of about 30 minutes to 30 hours.

The polyol curing using a polyhydroxy compound as the curing agent can be carried out in the same manner as in the prior art. For example, mention may be made of the method comprising subjecting the fluoroelastomer of the invention and a curing agent, if necessary together with a curing promoter and further another or other appropriate compatible additives, to roll milling, then placing the kneaded mass in a mold and applying pressure thereto for press curing, which is followed by post-curing. For the kneading, an internal mixer, a Banbury mixer or the like can be preferably used. Generally, the press curing can be carried out at 2 to 10 MPa and 100 to 200° C. for 5 to 60 minutes, and the post-curing at 150 to 300° C. for 30 minutes to 30 hours.

The peroxide curing using an organic peroxide as the curing agent can be carried out in the same manner as in the prior art. For example, mention may be made of the method comprising subjecting the fluoroelastomer of the invention and a curing agent, if necessary together with a curing promoter and further another or other appropriate compatible additives, to roll milling, then placing the kneaded mass in a mold and applying pressure thereto for press curing, which is followed by post-curing. Generally, the press curing can be carried out at 2 to 10 MPa and 100 to 200° C. for 5 to 60 minutes, and the post-curing at 150 to 300° C. for 30 minutes to 30 hours.

The third curable composition of the invention, which contains the third fluoroelastomer containing at least one iodine atom and/or at least one bromine atom, the total content thereof being 0.001 to 10% by weight, can attain a further increased cure density since the iodine or bromine termini serve as curing points (curing sites).

The above-mentioned third curable composition of the invention more preferably contains an organic peroxide as the curing agent. Since the third fluoroelastomer mentioned above has iodine atoms and/or bromine atoms, with the total content thereof being 0.001 to 10% by weight, the presence of an organic peroxide makes it possible to carry out the peroxide curing more easily. The organic peroxide includes those enumerated hereinabove and preferably comprises at least one compound selected, among others, from among 2,5-dimethyl-2,5-di(tert-butylperoxy)hexane and 2,5-dimethyl-2,5-di(tert-butylperoxy)hexyne-3. Further, the third curable composition of the invention preferably contains a curing aid. The curing aid includes those enumerated hereinabove and, among them, triallyl isocyanurate (TAIC) is preferred from the viewpoint that the curing performance thereof and the physical characteristics of the articles are excellent.

In the above-mentioned third curable composition, the level of addition of the curing aid is 0.01 to 10 parts by mass, preferably 0.1 to 5.0 parts by mass, per 100 parts by mass of the fluoroelastomer. At curing aid levels lower than 0.01 part by mass, the curing time tends to become too long to be suited to practical use and, at levels exceeding 10 parts by mass, the curing time becomes too short and, in addition, the articles tend to show decreases in permanent compression set.

The curing of the above-mentioned third curable composition is generally realized by baking at a temperature of 150 to 300° C. for 1 minute to 24 hours, although the curing conditions may be properly selected according to the curing agent species employed, among others. The curing can be realized at ordinary pressure or under increased or reduced pressure and in air as well.

The above-mentioned third curable composition is preferably one containing an organic peroxide as the curing agent and capable of being cured by peroxide curing. The peroxide curing using an organic peroxide as the curing agent can be carried out in the same manner as in the prior art. For example, mention may be made of the method comprising subjecting the third fluoroelastomer of the invention and a curing agent, if necessary together with a curing promoter and further another or other appropriate compatible additives, to roll milling, then placing the kneaded mass in a mold and applying pressure thereto for press curing, which is followed by post-curing. Generally, the press curing can be carried out at 2 to 10 MPa and 100 to 200° C. for 5 to 60 minutes, and the post-curing at 150 to 300° C. for 30 minutes to 30 hours.

The first, second or third curable composition of the invention also preferably contains a filler. As the filler, there may be mentioned metal oxides such as calcium oxide, titanium oxide and aluminum oxide; metal hydroxides such as magnesium hydroxide, aluminum hydroxide and calcium hydroxide; carbonates such as magnesium carbonate, aluminum carbonate, calcium carbonate and barium carbonate; silicates such as magnesium silicate, calcium silicate, sodium silicate and aluminum silicate; sulfates such as aluminum sulfate, calcium sulfate and barium sulfate; synthetic hydrotalcite; metal sulfides such as molybdenum disulfide, iron sulfide and copper sulfide; diatomaceous earth, asbestos, lithopone (zinc sulfide/barium sulfide), graphite, carbon black, carbon fluoride, calcium fluoride, coke, finely pulverized quartz, zinc white, talc, pulverized mica, wollastonite, carbon fibers, aramid fibers, various whiskers, glass fibers, organic reinforcing agents, organic fillers, polytetrafluoroethylene, mica, silica, Celite, clay and so forth.

The first, second or third curable composition of the invention also preferably contains a plasticizer. As the plasticizer, there may be mentioned dioctyl phthalate and pentaerythritol, among others.

The first, second or third curable composition of the invention also preferably contains a processing aid. As the processing aid, there may be mentioned higher fatty acids such as stearic acid, oleic acid, palm tic acid and lauric acid; higher fatty acid salts such as sodium stearate and zinc stearate; higher fatty acid amides such as stearamide and oleamide; higher fatty acid esters such as ethyl oleate; higher aliphatic amines such as stearylamine and oleylamine; carnauba wax; petroleum waxes such as ceresin wax; polyglycols such as ethylene glycol, glycerol and diethylene glycol; aliphatic hydrocarbons such as petrolatum and paraffin; silicone oils, silicone polymers, low-molecular-weight polyethylene, phthalic acid esters, phosphoric acid esters, rosin, (halogenated) dialkylamines, surfactants, sulfone compounds and fluorine-containing aids, among others.

The first, second or third curable composition of the invention may contain one or more of acid acceptors, mold release agents, pigments, flame retardants, lubricants, light stabilizers, weathering stabilizers, antistatic agents, ultraviolet absorbers, antioxidants, blowing agents, perfumes, oils, softeners and so forth, each at an addition level at which the effects of the present invention will not be affected.

The first, second or third curable composition of the invention may contain a solvent. When the fluoroelastomer is soluble in the solvent, the resulting composition can be used as a paint composition. The solvent includes ketone solvents and ester solvents, among others.

The first, second or third curable composition of the invention may contain another polymer different from the fluoroelastomer of the invention. As the other polymer, there may be mentioned, nitrile rubbers, acrylic rubbers, epichlorohydrin rubbers, fluorosilicone rubbers, silicone rubbers, fluorine-containing thermoplastic elastomers and poly(vinylidene fluoride), among others.

The first, second or third curable composition according to the invention is preferably one obtained by kneading at least one fluoroelastomer according to the first, second or third aspect of the invention together with a curing agent, if desired further together with one or more of the above-mentioned curing promoters and other ingredients.

The above kneading can be carried out using an open roll, Banbury mixer, press kneader or extruder, for instance; the use of a press kneader or an extruder such as a twin-screw extruder is preferred since a high shearing force can be applied therewith.

The present invention is also directed to cured rubber articles obtained by curing the first, second or third curable composition of the invention.

The cured rubber articles of the invention can be produced either by molding the first, second or third curable composition and curing the thus-obtained articles or by carrying out the molding and curing simultaneously. Further, the articles can also be obtained in the form of coating films by application of the curable composition, followed by curing.

The method of molding is not particularly restricted but includes, among others, compression molding, extrusion molding, transfer molding and injection molding.

The first, second or third cured rubber articles of the invention have good thermal stability, oil resistance, amine resistance, chemical resistance and low-temperature resistance and can be used as various parts in the automobile, airplane and semiconductor industries. Owing to their thermal stability, oil resistance and amine resistance, in particular, they can be suitably used as parts or members for oil sealing, for example as hoses, oil seals and the like for automotive engine oils. Other suitable articles are enumerated below.

Specifically, the articles include the following examples but are not limited thereto.

Seal Members:

Mention may be made of O- (or square) rings, packing members, gaskets, diaphragms, other various seal members, etc., for use in semiconductor-related fields, e.g. in semiconductor production equipment, liquid crystal panel production equipment, plasma panel production equipment, plasma address liquid crystal panels, field emission display panels and solar cell substrates, and these can be used in CVD apparatus, dry etching apparatus, wet etching apparatus, oxidation/diffusion apparatus, sputtering apparatus, ashing apparatus, cleaning apparatus, ion implantation apparatus and exhausters. More specifically, they can be used as O-rings or sealing members for gate valves, O-rings and other various seal members for quartz windows, O-rings and other various seal members for chambers, O-rings and other various seal members for gates, O-rings and other various seal members for bell jars, O-rings and other various seal members for couplings, O-rings, diaphragms and other various seal members for pumps, O-rings and other various seal members for gas-controlling devices for semiconductor production or processing, and O-rings and other various seal members for resist developing solutions and detaching solutions.

In the automobile field, the articles can be used as gaskets, shaft seals, valve stem seals and various seal members for use in engines and peripheral equipment and as various seal members for automatic transmission (AT) units. As the seal members to be used in fuel systems and peripheral devices, there may be mentioned O (square) rings, packing members, diaphragms and the like. More specifically, the articles can be used as engine head gaskets, metal gaskets, oil pan gaskets, crankshaft seals, cam shaft seals, valve stem seals, manifold packing members, seals for oxygen sensors, injector O-rings, injector packing members, fuel pump O-rings, diaphragms, crankshaft seals, gear box seals, power piston packing members, cylinder liner seals, valve stem seals, automatic transmission front pump seals, rear axle pinion seals, universal joint gaskets, speed meter pinion seals, foot brake piston cups, torque transmission O-rings, oil seals, exhaust gas recirculation system seals, bearing seals, carburetor sensor diaphragms and the like.

In the airplane, rocket and shipbuilding fields, mention may be made of diaphragms, O (square) rings, valves, packing members, various seal members and the like, and these can be used in fuel systems. More specifically, the articles are used in the airplane field as jet engine valve system seals, gaskets and O-rings, rotating shaft seals, hydraulic gaskets and fire wall seals, among others, and, in the shipbuilding field, as screw propeller shaft stern seals, diesel engine suction and exhaust valve stem seals, butterfly valve seals, butterfly valve shaft seals and so forth.

In the chemical plant field, mention may be made of valves, packing members, diaphragms, O (square) rings, various seal members, among others, and these can be used in various steps of producing chemicals such as medicinal chemicals, agrochemicals, paints and resins. More specifically, the articles can be used as seals in chemical pumps, flowmeters and piping systems, heat exchanger seals, glass cooler packing members in sulfuric acid production plants, seals in agrochemical spreaders and agrochemical transfer pumps, gas piping seals, plating bath seals, high-temperature vacuum drier packing members, papermaking belt roller seals, fuel cell seals, wind tunnel joint seals, tube joining part packing members in gas chromatographs and pH meters, and seals, diaphragms and valve parts in analytical apparatus and physical and chemical apparatus, among others. In the oil drilling field, the articles can be used as seal members such as a packer seal or seal members for logging for using at sea bottom or underground. Also, the articles can be used as seal members such as seal members for mud pump used for system of piping up oil above ground or at sea.

In the photographic field, including developing machines, in the printing field, including printing machines and in the painting field, including painting equipment, the articles can be used as seals and valve parts in dry-process copying machines, for instance.

In the food industry plant equipment field, mention may be made of valves, packing members, diaphragms, O (square) rings and various seal members, among others, and these can be used in food production/processing steps. More specifically, the articles can be used as plate type heat exchanger seals and vending machine electromagnetic valve seals, among others.

In the nuclear power plant equipment field, mention may be made of packing members, O-rings, diaphragms, valves and various seal members, among others.

In the general industry field, mention may be made of packing members, O-rings, diaphragms, valves and various seal members, among others. More specifically, the articles are used as seals and bearing seals in hydraulic and lubricating systems, windows and other seals in dry cleaning equipment, uranium hexafluoride enrichment apparatus seals, seal (vacuum) valves in cyclotrons, automatic packaging machine seals, diaphragms in pumps (in pollution-monitoring apparatus) for analyzing sulfurous acid gas and chlorine gas in air, and so forth.

In the electric system field, the articles are specifically used as bullet train (Shinkansen) insulating oil caps, liquid-sealed transformer benching seals and so forth.

In the fuel cell field, the articles are specifically used as seal materials between electrodes and separator and as seals in hydrogen, oxygen or product water piping systems, among others.

In the electronic component field, the articles are specifically used as radiator materials, electromagnetic wave shield materials, computer hard disk drive gaskets and so forth.

Those articles which can be produced by in situ molding are not particularly restricted but include, among others, engine oil pan gaskets, gaskets for magnetic recording apparatus, and clean room filter unit sealants.

They are also particularly suited for use as gaskets for magnetic recording apparatus (hard disk drives) and such sealants for clean equipment as sealants in semiconductor manufacturing apparatus or storehouses for wafers or other devices.

Further, they are particularly suited for use as packing members used between fuel cell electrodes or in peripheral piping systems and as other sealants for fuel cells, among others.

Sliding Members:

In the automobile-related fields, mention may be made of piston rings, shaft seals, valve stem seals, crankshaft seals, cam shaft seals and oil seals, among others.

Generally, mention may be made of fluororubber products used as parts sliding in contact with other materials.

Nonadhesive Members:

Mention may be made of hard disk crash stoppers in the computer field, for instance.

Fields Utilizing Water Repellency and Oil Repellency:

Mention may be made of automobile wiper blades, coated fabrics for outdoor tents, and so forth.

EXAMPLES

The following examples illustrate the present invention more specifically. These examples are, however, by no means limitative of the scope of the present invention.

The physical characteristics reported herein were measured by the following methods.

[Copolymer Composition]

The copolymer compositions were determined by the NMR method.

Measuring apparatus: Varian VNMRS400
Resonance frequency: 376.04 (Sfrq)
Pulse wave: 30° (pw=6.8)

[Glass Transition Temperature (Tg)]

A DSC curve was obtained by heating 10 mg of a sample at a programming rate of 10° C./minute using a differential scanning calorimeter (Mettler Toredo DSC 822e), and the temperature indicated by the point of intersection of an extension of the baseline in the vicinity of the second-order transition point on the DSC curve with the tangent to the DSC curve at the point of inflection was recorded as the glass transition temperature of the sample.

[Heat of Fusion]

A DSC curve was obtained by heating 10 mg of a sample at a programming rate of 10° C./minute using a differential scanning calorimeter (Mettler Toredo DSC 822e), and the heat of fusion was calculated based on the size of the fusion peak ($\Delta H$) found on the DSC curve.

[Number Average Molecular Weight (Mn) and Weight Average Molecular Weight (Mw)]

Molecular weight calculations were made based on the results of measurements by the GPC method using reference polystyrene species as standards.

GPC apparatus: TOSOH HLC-8020
Column: Shodex GPC806M (two columns), GPC801 and 802 each one column
Developing solvent: tetrahydrofuran [THF]
Sample concentration: 0.1% by mass
Measurement temperature: 35° C.

Example 1

A 100-ml stainless steel (SUS) autoclave was charged with 40 ml of dichloropentafluoropropane (R-225), the contents were cooled to the dry ice temperature, 9.20 g of a perfluorohexane solution containing di(2,2,3,3,4,4,5,5,6,6,7,7-dodecafluoroheptanoyl)peroxide at a concentration of 8% by weight was quickly fed into the autoclave, the contents were cooled to the dry ice temperature and, after nitrogen substitution, 12.4 g of 2,3,3,3-tetrafluoropropene (hereinafter sometimes referred to as "1234yf" or merely as "yf") and 7.1 g of VdF were fed into the autoclave. The resulting mixture was shaken at 25° C. for 5.3 hours using a shaker. The colorless transparent solution obtained was dried to give 2.5 g of a colorless transparent polymer. The polymer obtained was found to be composed of 1234yf and VdF in a mol ratio of 77/23. The Tg of the polymer obtained was determined to be 24.6° C. by DSC. No melting peak was confirmed. The Mn was 7190 and the weight average molecular weight (Mw) was 10500, hence the ratio Mw/Mn was 1.5.

Example 2

A 100-ml stainless steel (SUS) autoclave was charged with 40 ml of dichloropentafluoropropane (R-225), the contents were cooled to the dry ice temperature, 9.20 g of a perfluorohexane solution containing di(2,2,3,3,4,4,5,5,6,6,7,7-dodecafluoroheptanoyl)peroxide at a concentration of 8% by weight was quickly fed into the autoclave, the contents were cooled to the dry ice temperature and, after nitrogen substitution, 5.0 g of 2,3,3,3-tetrafluoropropene (hereinafter sometimes referred to as "1234yf" or merely as "yf") and 11.0 g of VdF were fed into the autoclave. The resulting mixture was shaken at 25° C. for 5.2 hours using a shaker. The colorless transparent solution obtained was dried to give 3.5 g of a colorless transparent polymer. The polymer obtained was found to be composed of 1234yf and VdF in a mol ratio of 51/49. The Tg of the polymer obtained was determined to be 7.0° C. by DSC. No melting peak was confirmed. The Mn was 10300 and the weight average molecular weight (Mw) was 16000, hence the ratio Mw/Mn was 1.5.

Example 3

A 100-ml stainless steel (SUS) autoclave was charged with 40 ml of dichloropentafluoropropane (R-225), the contents were cooled to the dry ice temperature, 9.20 g of a perfluorohexane solution containing di(2,2,3,3,4,4,5,5,6,6,7,7-dodecafluoroheptanoyl)peroxide at a concentration of 8% by weight was quickly fed into the autoclave, the contents were cooled to the dry ice temperature and, after nitrogen substitution, 2.7 g of 2,3,3,3-tetrafluoropropene (hereinafter sometimes referred to as "1234yf" or merely as "yf") and 12.6 g of VdF were fed into the autoclave. The resulting mixture was shaken at 25° C. for 5.1 hours using a shaker. The colorless transparent solution obtained was dried to give 3.5 g of a colorless transparent polymer. The polymer obtained was found to be composed of 1234yf and VdF in a mol ratio of 38/62. The Tg of the polymer obtained was determined to be −5.2° C. by DSC. No melting peak was confirmed. The Mn was 9200 and the weight average molecular weight (Mw) was 16000, hence the ratio Mw/Mn was 1.5.

Example 4

A 100-ml stainless steel (SUS) autoclave was charged with 40 ml of dichloropentafluoropropane (R-225), the contents were cooled to the dry ice temperature, 9.18 g of a perfluorohexane solution containing di(2,2,3,3,4,4,5,5,6,6,7,7-dodecafluoroheptanoyl)peroxide at a concentration of 8% by weight was quickly fed into the autoclave, the contents were cooled to the dry ice temperature and, after nitrogen substitution, 1.3 g of 2,3,3,3-tetrafluoropropene (hereinafter sometimes referred to as "1234yf" or merely as "yf") and 13.2 g of VdF were fed into the autoclave. The resulting mixture was shaken at 25° C. for 1.2 hours using a shaker. The colorless transparent solution obtained was dried to give 0.9 g of a colorless transparent polymer. The polymer obtained was found to be composed of 1234yf and VdF in a mol ratio of 28/72. The Tg of the polymer obtained was determined to be −16.6° C. by DSC. No melting peak was confirmed. The Mn was 7400 and the weight average molecular weight (Mw) was 12000, hence the ratio Mw/Mn was 1.7.

Example 5

A 100-ml stainless steel (SUS) autoclave was charged with 40 ml of dichloropentafluoropropane (R-225), the contents were cooled to the dry ice temperature, 2.35 g of a perfluorohexane solution containing di(2,2,3,3,4,4,5,5,6,6,7,7-dodecafluoroheptanoyl)peroxide at a concentration of 8% by weight was quickly fed into the autoclave, the contents were cooled to the dry ice temperature and, after nitrogen substitution, 0.8 g of 2,3,3,3-tetrafluoropropene (hereinafter sometimes referred to as "1234yf" or merely as "yf") and 13.4 g of VdF were fed into the autoclave. The resulting mixture was shaken at 25° C. for 2.0 hours using a shaker. The colorless transparent solution obtained was dried to give 1.0 g of a colorless transparent polymer. The polymer obtained was found to be composed of 1234yf and VdF in a mol ratio of 29/71. The Tg of the polymer obtained was determined to be −14.8° C. by DSC. No melting peak was confirmed. The Mn was 31000 and the weight average molecular weight (Mw) was 47000, hence the ratio Mw/Mn was 1.5.

Comparative Example 1

A 100-ml stainless steel (SUS) autoclave was charged with 40 ml of dichloropentafluoropropane (R-225), the contents were cooled to the dry ice temperature, 9.20 g of a perfluorohexane solution containing di(2,2,3,3,4,4,5,5,6,6,7,7-dodecafluoroheptanoyl)peroxide at a concentration of 8% by weight was quickly fed into the autoclave, the contents were cooled to the dry ice temperature and, after nitrogen substitution, 17.6 g of 2,3,3,3-tetrafluoropropene (hereinafter sometimes referred to as "1234yf" or merely as "yf") and 4.0 g of VdF were fed into the autoclave. The resulting mixture was shaken at 25° C. for 5.1 hours using a shaker. The colorless transparent solution obtained was dried to give 2.8 g of a colorless transparent polymer. The polymer obtained was found to be composed of 1234yf and VdF in a mol ratio of 87/13. The Tg of the polymer obtained was determined to be 32.4° C. by DSC. No melting peak was confirmed. The Mn was 7000 and the weight average molecular weight (Mw) was 10200, hence the ratio Mw/Mn was 1.5.

Comparative Example 2

A 100-ml stainless steel (SUS) autoclave was charged with 40 ml of dichloropentafluoropropane (R-225), the contents were cooled to the dry ice temperature, 1.21 g of a perfluorohexane solution containing di(2,2,3,3,4,4,5,5,6,6,7,7-dodecafluoroheptanoyl)peroxide at a concentration of 8% by weight was quickly fed into the autoclave, the contents were cooled to the dry ice temperature and, after nitrogen substitution, 0.5 g of 2,3,3,3-tetrafluoropropene (hereinafter sometimes referred to as "1234yf" or merely as "yf") and 13.6 g of VdF were fed into the autoclave. The resulting mixture was shaken at 25° C. for 1.6 hours using a shaker. The colorless transparent solution obtained was dried to give 2.1 g of a colorless transparent polymer. The polymer obtained was found to be composed of 1234yf and VdF in a mol ratio of 4/96. Any Tg of the polymer obtained could not be confirmed. No melting peak was confirmed. The Mn was 14700 and the Mw was 25300, hence the ratio Mw/Mn was 1.7.

Comparative Example 3

A 100-ml stainless steel (SUS) autoclave was charged with 40 ml of dichloropentafluoropropane (R-225), the contents were cooled to the dry ice temperature, 1.10 g of a perfluorohexane solution containing di(2,2,3,3,4,4,5,5,6,6,7,7-dodecafluoroheptanoyl)peroxide at a concentration of 8% by weight was quickly fed into the autoclave, the contents were cooled to the dry ice temperature and, after nitrogen substitution, 0.6 g of 2,3,3,3-tetrafluoropropene (hereinafter sometimes referred to as "1234yf" or merely as "yf") and 13.4 g of VdF were fed into the autoclave. The resulting mixture was shaken at 25° C. for 1.0 hour using a shaker. The colorless transparent solution obtained was dried to give 0.3 g of a colorless transparent polymer. The polymer obtained was found to be composed of 1234yf and VdF in a mol ratio of 13/87. The Tg of the polymer obtained was determined to be −23.5° C. by DSC. A melting peak showing a heat of fusion of 15 J/g was observed in the vicinity of 96° C. The Mn was 13800 and the Mw was 26300, hence the ratio Mw/Mn was 1.9.

Example 6

A 100-ml stainless steel (SUS) autoclave was charged with 40 ml of dichloropentafluoropropane (R-225), the contents were cooled to the dry ice temperature, 4.61 g of a perfluorohexane solution containing di(2,2,3,3,4,4,5,5,6,6,7,7-dodecafluoroheptanoyl)peroxide at a concentration of 8% by weight was quickly fed into the autoclave, the contents were cooled to the dry ice temperature and, after nitrogen substitution, 1.6 g of 2,3,3,3-tetrafluoropropene (hereinafter sometimes referred to as "1234yf" or merely as "yf"), 3.7 g of TFE and 11.1 g of VdF were fed into the autoclave. The resulting mixture was shaken at 25° C. for 3.0 hours using a shaker. The colorless transparent solution obtained was dried to give 4.5 g of a colorless transparent polymer. The polymer obtained was found to be composed of 1234yf, VdF and TFE in a mol ratio of 23/59/18. The Tg of the polymer obtained was determined to be −11.3° C. by DSC. No melting peak was confirmed. The Mn was 58000 and the weight average molecular weight (Mw) was 91000, hence the ratio Mw/Mn was 1.6.

Example 7

A 100-ml stainless steel (SUS) autoclave was charged with 40 ml of dichloropentafluoropropane (R-225), the contents were cooled to the dry ice temperature, 1.25 g of a perfluorohexane solution containing di(2,2,3,3,4,4,5,5,6,6,7,7-dodecafluoroheptanoyl)peroxide at a concentration of 8% by weight was quickly fed into the autoclave, the contents were cooled to the dry ice temperature and, after nitrogen substitution, 1.0 g of 2,3,3,3-tetrafluoropropene (hereinafter sometimes referred to as "1234yf" or merely as "yf"), 7.9 g of TFE and 8.0 g of VdF were fed into the autoclave. The resulting mixture was shaken at 25° C. for 2.0 hours using a shaker. The colorless transparent solution obtained was dried to give 1.6 g of a colorless transparent polymer. The polymer obtained was found to be composed of 1234yf, VdF and TFE in a mol ratio of 21/55/24. The Tg of the polymer obtained was determined to be −7.5° C. by DSC. A melting peak showing a heat of fusion of 1.6 J/g was observed in the vicinity of 50° C. The Mn was 84000 and the weight average molecular weight (Mw) was 120000, hence the ratio Mw/Mn was 1.4.

Example 8

A 100-ml stainless steel (SUS) autoclave was charged with 40 ml of dichloropentafluoropropane (R-225), the contents were cooled to the dry ice temperature, 1.31 g of a perfluorohexane solution containing di(2,2,3,3,4,4,5,5,6,6,7,7-dodecafluoroheptanoyl)peroxide at a concentration of 8% by weight was quickly fed into the autoclave, the contents were cooled to the dry ice temperature and, after nitrogen substitution, 0.2 g of 2,3,3,3-tetrafluoropropene (hereinafter sometimes referred to as "1234yf" or merely as "yf"), 1.0 g of TFE and 13.0 g of VdF were fed into the autoclave. The resulting mixture was shaken at 25° C. for 3.0 hours using a shaker. The colorless transparent solution obtained was dried to give 1.5 g of a colorless transparent polymer. The polymer obtained was found to be composed of 1234yf, VdF and TFE in a mol ratio of 27/68/5. The Tg of the polymer obtained was determined to be −12.3° C. by DSC. No melting peak was confirmed. The Mn was 29000 and the weight average molecular weight (Mw) was 47000, hence the ratio Mw/Mn was 1.6.

Example 9

A 100-ml stainless steel (SUS) autoclave was charged with 40 ml of dichloropentafluoropropane (R-225), the contents were cooled to the dry ice temperature, 1.21 g of a perfluorohexane solution containing di(2,2,3,3,4,4,5,5,6,6,7,7-dodecafluoroheptanoyl)peroxide at a concentration of 8% by weight was quickly fed into the autoclave, the contents were cooled to the dry ice temperature and, after nitrogen substitution, 1.0 g of 2,3,3,3-tetrafluoropropene (hereinafter sometimes referred to as "1234yf" or merely as "yf"), 1.8 g of TFE and 12.0 g of VdF were fed into the autoclave. The resulting mixture was shaken at 25° C. for 1.0 hours using a shaker. The colorless transparent solution obtained was dried to give 0.6 g of a colorless transparent polymer. The polymer obtained was found to be composed of 1234yf, VdF and TFE in a mol ratio of 17/70/13. The Tg of the polymer obtained was determined to be −20.5° C. by DSC. No melting peak was confirmed. The Mn was 30000 and the weight average molecular weight (Mw) was 49000, hence the ratio Mw/Mn was 1.6.

Example 10

A 100-ml stainless steel (SUS) autoclave was charged with 40 ml of dichloropentafluoropropane (R-225), the contents were cooled to the dry ice temperature, 1.13 g of a perfluorohexane solution containing di(2,2,3,3,4,4,5,5,6,6,7,7-dodecafluoroheptanoyl)peroxide at a concentration of 8% by weight was quickly fed into the autoclave, the contents were cooled to the dry ice temperature and, after nitrogen substitution, 3.4 g of 2,3,3,3-tetrafluoropropene (hereinafter sometimes referred to as "1234yf" or merely as "yf"), 3.4 g of TFE and 9.7 g of VdF were fed into the autoclave. The resulting mixture was shaken at 25° C. for 0.5 hours using a shaker. The colorless transparent solution obtained was dried to give 0.2 g of a colorless transparent polymer. The polymer obtained was found to be composed of 1234yf, VdF and TFE in a mol ratio of 39/50/11. The Tg of the polymer obtained was determined to be 2.8° C. by DSC. No melting peak was confirmed. The Mn was 16800 and the weight average molecular weight (Mw) was 31000, hence the ratio Mw/Mn was 1.9.

Comparative Example 4

A 100-ml stainless steel (SUS) autoclave was charged with 40 ml of dichloropentafluoropropane (R-225), the contents were cooled to the dry ice temperature, 1.15 g of a perfluorohexane solution containing di(2,2,3,3,4,4,5,5,6,6,7,7-dodecafluoroheptanoyl)peroxide at a concentration of 8% by weight was quickly fed into the autoclave, the contents were cooled to the dry ice temperature and, after nitrogen substitution, 0.3 g of 2,3,3,3-tetrafluoropropene (hereinafter sometimes referred to as "1234yf" or merely as "yf"), 4.0 g of TFE and 11.0 g of VdF were fed into the autoclave. The resulting mixture was shaken at 25° C. for 1.0 hours using a shaker. The colorless transparent solution obtained was dried to give 1.1 g of a colorless transparent polymer. The polymer obtained was found to be composed of 1234yf, VdF and TFE in a mol ratio of 9/64/27. The Tg of the polymer obtained was determined to be −15.9° C. by DSC. A melting peak showing a heat of fusion of 7.4 J/g was observed in the vicinity of 92° C. The Mn was 26600 and the weight average molecular weight (Mw) was 57200, hence the ratio Mw/Mn was 2.2.

Comparative Example 5

A 100-ml stainless steel (SUS) autoclave was charged with 40 ml of dichloropentafluoropropane (R-225), the contents were cooled to the dry ice temperature, 1.39 g of a perfluorohexane solution containing di(2,2,3,3,4,4,5,5,6,6,7,7-dodecafluoroheptanoyl)peroxide at a concentration of 8% by weight was quickly fed into the autoclave, the contents were cooled to the dry ice temperature and, after nitrogen substitution, 23.0 g of hexafluoropropylene (hereinafter sometimes referred to as "HFP") and 4.0 g of VdF were fed into the autoclave. The resulting mixture was shaken at 25° C. for 8.7 hours using a shaker. The colorless transparent solution obtained was dried to give 1.6 g of a colorless transparent polymer. The polymer obtained was found to be composed of HFP and VdF in a mol ratio of 69/31. The Tg of the polymer obtained was determined to be −3.8° C. by DSC. No melting peak was confirmed. The Mn was 10900 and the weight average molecular weight (Mw) was 17000, hence the ratio Mw/Mn was 1.6.

Comparative Example 6

A 100-ml stainless steel (SUS) autoclave was charged with 40 ml of dichloropentafluoropropane (R-225), the contents were cooled to the dry ice temperature, 1.55 g of a perfluorohexane solution containing di(2,2,3,3,4,4,5,5,6,6,7,7-dodecafluoroheptanoyl)peroxide at a concentration of 8% by weight was quickly fed into the autoclave, the contents were cooled to the dry ice temperature and, after nitrogen substitution, 27.3 g of hexafluoropropylene (hereinafter sometimes referred to as "HFP") and 2.0 g of VdF were fed into the autoclave. The resulting mixture was shaken at 25° C. for 6.5 hours using a shaker. The colorless transparent solution obtained was dried to give 1.1 g of a colorless transparent polymer. The polymer obtained was found to be composed of HFP and VdF in a mol ratio of 68/32. The Tg of the polymer obtained was determined to be −3.0° C. by DSC. No melting peak was confirmed. The Mn was 7700 and the weight average molecular weight (Mw) was 12000, hence the ratio Mw/Mn was 1.6.

Comparative Example 7

A 100-ml stainless steel (SUS) autoclave was charged with 40 ml of dichloropentafluoropropane (R-225), the contents were cooled to the dry ice temperature, 1.54 g of a perfluorohexane solution containing di(2,2,3,3,4,4,5,5,6,6,7,7-dodecafluoroheptanoyl)peroxide at a concentration of 8% by weight was quickly fed into the autoclave, the contents were cooled to the dry ice temperature and, after nitrogen substitution, 30.1 g of HFP and 1.4 g of VdF were fed into the autoclave. The resulting mixture was shaken at 25° C. for 7.4 hours using a shaker. The colorless transparent solution obtained was dried to give 1.6 g of a colorless transparent polymer. The polymer obtained was found to be composed of HFP and VdF in a mol ratio of 68/32. The Tg of the polymer obtained was determined to be −1.7° C. by DSC. No melting peak was confirmed. The Mn was 9900 and the weight average molecular weight (Mw) was 1500, hence the ratio Mw/Mn was 1.5.

Comparative Example 8

A 100-ml stainless steel (SUS) autoclave was charged with 40 ml of dichloropentafluoropropane (R-225), the contents were cooled to the dry ice temperature, 1.49 g of a perfluorohexane solution containing di(2,2,3,3,4,4,5,5,6,6,7,7-dodecafluoroheptanoyl)peroxide at a concentration of 8% by weight was quickly fed into the autoclave, the contents were cooled to the dry ice temperature and, after nitrogen substitution, 18.5 g of HFP and 6.2 g of VdF were fed into the autoclave. The resulting mixture was shaken at 25° C. for 2.1 hours using a shaker. The colorless transparent solution obtained was dried to give 1.2 g of a colorless transparent polymer. The polymer obtained was found to be composed of HFP and VdF in a mol ratio of 76/24. The Tg of the polymer obtained was determined to be −13.6° C. by DSC. No melting peak was confirmed. The Mn was 12000 and the weight average molecular weight (Mw) was 21000, hence the ratio Mw/Mn was 1.7.

As shown in the drawing, the VdF/2,3,3,3-tetrafluoropropene copolymers obtained in Examples 2 to 5 were found to be lower in glass transition temperature than the VdF/HFP copolymers obtained in Comparative Examples 5 to 8.

Reference Example 1

A 500-ml stainless steel autoclave was charged with 250 ml of pure water and 1.55 g of ammonium perfluorooctanoate and, after nitrogen substitution, the autoclave inside was slightly pressurized with 1234yf, and the temperature was adjusted to 80° C. with stirring at 600 rpm, followed by feeding with 1234yf under pressure until arrival of the inside pressure at 0.29 MPa, further followed by feeding with VdF until arrival at 0.72 MPa. A solution of 0.1 g of ammonium persulfate in 4 ml of pure water was fed into the autoclave under nitrogen pressure. At 6.5 hours after start of the reaction, the pressure showed a reduction by 0.04 MPa, when the autoclave inside gas was released, and the remaining dispersion was cooled and recovered. The dispersion had a solid content of 2.1% by weight. Nitric acid was added to this dispersion for causing coagulation to give about 2 g of a copolymer. According to NMR data, the mol ratio 1234yf/VdF was 50/50. This copolymer had a glass transition temperature of 0.1° C.

Example 11

A 3-liter stainless steel autoclave was charged with 1500 ml of pure water, 15.03 g of ammonium perfluorooctanoate and 1.4297 g of 1,4-diiodoperfluorobutane and, after nitrogen substitution, the autoclave inside was slightly pressurized with 1234yf, and the temperature was adjusted to 80° C. with stirring at 600 rpm, followed by feeding with 1234yf until arrival of the inside pressure at 1.21 MPa, further followed by feeding with a liquid monomer mixture composed of VdF and 1234yf in a mol ratio of 69/31 under pressure until arrival at 1.47 MPa. A solution of 0.0243 g of ammonium persulfate in 4 ml of pure water was fed into the autoclave under nitrogen pressure. Each time the pressure lowered to 1.42 MPa, the pressure was raised to 1.47 MPa with the consistent monomer mixture. By repeating this procedure, a total of 222 g of the consistent monomer mixture was fed into the autoclave over 6.68 hours. The autoclave inside gas was then discharged, the remaining contents were cooled, and 1730.6 g of a dispersion was recovered. During the polymerization, ammonium persulfate was supplemented in an appropriate manner. The dispersion had a solid content of 13.3% by weight (polymer amount 230.3 g). Nitric acid was added to the dispersion for coagulation, and the subsequent drying gave 224.41 g of a polymer. The polymer obtained was composed of 1234yf and VdF in a mol ratio of 31/69. The Tg of the polymer obtained as determined by DSC was −16.6° C. The heat of fusion peak was not observed in the second run. The number average molecular weight (Mn) was 69837, the weight average molecular weight (Mw) was 169549, the ratio Mw/Mn was 2.4, and the fluorine content was 62.6% by weight. The iodine content was 0.23% by weight. The iodine content can be measured by admixing 5 mg of $Na_2SO_3$ with 12 mg of the sample (polymer obtained), combusting the mixture in oxygen in a quartz flask using an absorbing solution prepared by dissolving 30 mg of a 1:1 (weight ratio) mixture of $Na_2CO_3$ and $K_2CO_3$ in 20 ml of pure water and, after 30 minutes of standing, subjecting the absorbing solution to assaying using a Shimadzu 20A ion chromatograph. Two standard KI solutions containing 0.5 ppm and 1.0 ppm of the iodide ion, respectively, were used for drawing the working curve used for the assaying.

Using the polymer (yf polymer) obtained in Example 11, a curable composition (composition 1) was prepared according to the formulation shown below in Table 1. Comparative curable compositions (1 to 3) were prepared according to the respective formations shown below in Table 1.

Each curable composition was prepared in the conventional manner by blending the corresponding raw rubber with the indicated amounts of the additives using an 8-inch open roll.

TABLE 1

|  | Curable composition 1 | Comparative curable composition 1 | Comparative curable composition 2 | Comparative curable composition 3 |
|---|---|---|---|---|
| Polymer of Example 11 (phr) | 100 | — | — | — |
| VdF/HFP copolymer (phr) | — | — | 100 | — |
| VdF/HFP/TFE copolymer (phr) | — | — | — | 100 |
| TFE/Pr copolymer (phr) | — | 100 | — | — |
| MT Carbon (phr) | 20 | 20 | 20 | 20 |
| Taic (phr) | 4 | 5 | 4 | 4 |
| Perhexa 25B (phr) | 1.5 | — | 1.5 | 1.5 |
| Perbutyl P (phr) | — | 2 | — | — |

The materials shown in Table 1 are as follows.
VdF/HFP copolymer (VdF/HFP=78/22 mol percent)
VdF/HFP/TFE copolymer (VdF/HFP/TFE=50/30/20 mol percent)

TFE/Pr copolymer (TFE/Pr=55/45 mol percent)
MT Carbon (trademark: Thermax N990, product of Cancarb Ltd.)
Taic (trademark: TAIC, product of Nippon Kasei Chemical Co., Ltd.)
Perhexa 25B (product of NOF Corporation)
Perbutyl P (product of NOF Corporation)

In Table 2, there are shown the VdF content, fluorine content, iodine content, glass transition temperature (Tg) and Mooney viscosity (ML1+10(100° C.)) of each of the polymer of Example 11 and the VdF/HFP copolymer, VdF/HFP/TFE copolymer and TFE/Pr copolymer. The Mooney viscosity measurements were made under the following conditions.

<Mooney Viscosity>

Measurements are made according to ASTM D 1646 and JIS K 6300.
Measuring apparatus: Alpha Technologies model MV2000E
Number of rotor revolutions: 2 rpm
Measurement temperature: 100° C.

TABLE 2

|  | Polymer of Example 11 | TFE/Pr copolymer | VdF/HFP copolymer | VdF/HFP/TFE copolymer |
|---|---|---|---|---|
| VdF content (mol %) | 69 | — | 78 | 50 |
| Fluorine content (mass %) | 63 | 57 | 66 | 69 |
| Iodine content (mass %) | 0.36 | 0 | 0.21 | 0.15 |
| Tg (° C.) | −16 | −3 | −16 | −8 |
| ML1 + 10 (100° C.) | 54 | 60 | 34 | 97 |

Using the curable compositions produced in the above manner, their curing (crosslinking) characteristics were examined. As for the curing characteristics, the lowest torque (ML), highest torque (MH), induction time (T10) and optimum cure time (T90) were measured according to JIS K 6300-2 using a type II curastometer (product of JSR Corporation). The results are shown below in Table 3.

TABLE 3

|  | Curable composition 1 | Comparative curable composition 1 | Comparative curable composition 2 | Comparative curable composition 3 |
|---|---|---|---|---|
| Press molding conditions | 160° C. × 10 min | 170° C. × 10 min | 160° C. × 10 min | 160° C. × 10 min |
| Heat treatment conditions | 180° C. × 4 hour | 200° C. × 4 hour | 180° C. × 4 hour | 180° C. × 4 hour |
| Measurement temperature | 160 | 170 | 160 | 160 |
| ML (N) | 0.5 | 1.0 | 0.2 | 4.9 |
| MH (N) | 27.4 | 19.6 | 30.9 | 44.6 |
| t10 (min) | 0.8 | 0.7 | 0.8 | 1.1 |
| t190 (min) | 2.5 | 9.6 | 2.1 | 2.4 |

Then, the articles resulting from curing of the respective curable compositions were subjected to amine resistance testing, followed by 100% modulus (M100), tensile strength at break (Tb),, tensile elongation at break (Eb) and hardness (Hs [Shore A]) measurements. Volume swells (ΔV) were also determined. The initial characteristics prior to amine resistance testing are shown in Table 4. The respective measurement conditions were as given below.

The volume swell ΔV is the volumetric increase (indicative of the degree of swelling) after immersion of each test specimen under predetermined conditions and is represented by the formula: $\Delta V = (V - V_0)/V_0 \times 100$, where $V_0$ is the original volume of the test specimen and V is the volume after testing. The volume value is calculated from the weight in air and the weight in water.

100% Modulus (M100)
  Measurements were made according to JIS K 6251.
Tensile Strength at Break (Tb)
  Measurements were made according to JIS K 6251.
Tensile Elongation at Break (Eb)
  Measurements were made according to JIS K 6251.
Shore Hardness (Shore A)
  Measurements were made according to JIS K 6253 using a type A durometer (peak value and after 1 second).
Specific Gravity
  Each specific gravity value was determined after density measurement according to JIS K 6253.

TABLE 4

|  | Curable composition 1 | Comparative curable composition 1 | Comparative curable composition 2 | Comparative curable composition 3 |
|---|---|---|---|---|
| 100% Modulus (MPa) | 1.9 | 2.9 | 2.0 | 2.5 |
| Tb (MPa) | 20.9 | 13.9 | 23.2 | 22.3 |
| Eb (%) | 455 | 325 | 410 | 365 |
| Hs (Shore A, peak) | 67 | 73 | 67 | 71 |
| Specific gravity | 1.72 | 1.59 | 1.80 | 1.87 |

Amine Resistance Testing

Each articles resulting from curing of the respective curable compositions was subjected to immersion testing using a Toyota standard oil (product of Toyota Motor Corporation, SJ Oil Toyota Genuine Oil SJ 10W-30) at 175° C. for 185 hours.

For each articles resulting from curing of the respective curable compositions after immersion testing, the 100% modulus, Tb, Eb, Hs (Shore A, peak) and volume swell (ΔV) were measured; the respective changes from the values before immersion are shown in Table 5 in percentages.

TABLE 5

|  | Curable composition 1 | Comparative curable composition 1 | Comparative curable composition 2 | Comparative curable composition 3 |
|---|---|---|---|---|
| Δ 100% Modulus (%) | 5 | −10 | 15 | 12 |
| Δ Tb (%) | −5 | −6 | −77 | −64 |
| Δ Eb (%) | 1 | −8 | −54 | −42 |
| Δ Hs (Shore A, peak) (%) | −4 | −7 | −3 | −2 |
| Δ V (%) | 0 | 8 | 1 | 1 |

INDUSTRIAL APPLICABILITY

The fluoroelastomer according to the invention can be suitably utilized in producing various parts or members for use in the automobile, airplane and semiconductor industries.

The invention claimed is:

1. A noncrystalline fluoroelastomer which is a copolymer comprising vinylidene fluoride, a fluoromonomer represented by the general formula (1):

$$CH_2=CFR_f \qquad (1)$$

wherein $R_f$ is a straight or branched fluoroalkyl group containing 1 to 12 carbon atoms, and another monomer copolymerizable with both vinylidene fluoride and said fluoromonomer of formula (1), and has a vinylidene fluoride units/fluoromonomer units mol ratio of 85/15 to 20/80, contains the other monomer units in the amount of 0 to 50 mol percent of all the monomer units, has a glass transition temperature of not higher than 25° C. and contains at least one iodine atom and/or at least one bromine atom, the total content thereof being 0.001 to 10% by weight.

2. The fluoroelastomer according to claim 1,
which is a copolymer consisting essentially of vinylidene fluoride and a fluoromonomer represented by the general formula (1):

$$CH_2=CFR_f \qquad (1)$$

wherein $R_f$ is a straight or branched fluoroalkyl group containing 1 to 12 carbon atoms, and has a vinylidene fluoride units/fluoromonomer units mol=ratio of 80/20 to 20/80.

3. The fluoroelastomer according to claim 1,
wherein the vinylidene fluoride units/fluoromonomer units mol ratio is 85/15 to 50/50 and the other monomer units amount to 1 to 50 mol percent of all the monomer units.

4. The fluoroelastomer according to claim 1,
wherein the fluoromonomer is 2,3,3,3-tetrafluoropropene.

5. A curable composition comprising the fluoroelastomer according to claim 1, and a curing agent.

6. The curable composition according to claim 5,
which contains an organic peroxide as the curing agent.

7. A cured rubber article obtained by curing the curable composition according to claim 5.

* * * * *